United States Patent
Brückner et al.

(10) Patent No.: US 7,916,738 B2
(45) Date of Patent: Mar. 29, 2011

(54) METHOD FOR CREATING A DYNAMIC ADDRESS TABLE FOR A SWITCHING NODE IN A DATA NETWORK AND A METHOD FOR TRANSMITTING A DATA MESSAGE

(75) Inventors: Dieter Brückner, Unterleiterbach (DE); Franz-Josef Götz, Heideck (DE); Dieter Klotz, Fürth (DE); Jürgen Schimmer, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 1831 days.

(21) Appl. No.: 10/489,764

(22) PCT Filed: Sep. 13, 2002

(86) PCT No.: PCT/DE02/03431
§ 371 (c)(1),
(2), (4) Date: Mar. 16, 2004

(87) PCT Pub. No.: WO03/028308
PCT Pub. Date: Apr. 3, 2003

(65) Prior Publication Data
US 2004/0246963 A1    Dec. 9, 2004

(30) Foreign Application Priority Data
Sep. 26, 2001   (DE) .................................. 101 47 419

(51) Int. Cl.
*H04L 12/28* (2006.01)
(52) U.S. Cl. ........ 370/401; 370/241; 370/258; 370/389; 370/413; 370/466; 709/220; 709/227; 709/238; 709/311

(58) Field of Classification Search ................ 370/412, 370/413, 466, 402, 241, 255, 258, 353, 389, 370/392, 401; 709/220, 227, 229, 238, 245, 709/311
See application file for complete search history.

(56) References Cited

U.S. PATENT DOCUMENTS

| | | | |
|---|---|---|---|
| 5,151,897 A * | 9/1992 | Suzuki | 370/401 |
| 5,519,841 A * | 5/1996 | Sager et al. | 711/202 |
| 5,740,171 A * | 4/1998 | Mazzola et al. | 370/392 |
| 5,768,531 A | 6/1998 | Lin | |
| 5,790,770 A * | 8/1998 | McClure et al. | 709/231 |
| 5,796,944 A * | 8/1998 | Hill et al. | 709/250 |
| 5,909,564 A * | 6/1999 | Alexander et al. | 710/316 |
| 5,917,821 A * | 6/1999 | Gobuyan et al. | 370/392 |
| 5,923,660 A * | 7/1999 | Shemla et al. | 370/402 |

(Continued)

FOREIGN PATENT DOCUMENTS

DE     100 58 524 A1    6/2002

(Continued)

*Primary Examiner* — Ayaz R Sheikh
*Assistant Examiner* — Andrew C Lee

(57) ABSTRACT

The invention relates to a switching node comprising a dynamic address table in a data network, in addition to a method for creating a dynamic address table of this type for a switching node. The method comprises the following steps: receipt of a first data message with a source address at a port of the switching node; entry of the source address, details of the port and a counter initial value in a line of the address table that is assigned to the source address as the target address, whereby the current counter value indicates the validity of the entry and the current counter value is modified, if a second data message with the source address as the target address is received and the entry is valid.

12 Claims, 3 Drawing Sheets

U.S. PATENT DOCUMENTS

| | | | | |
|---|---|---|---|---|
| 5,946,679 | A  * | 8/1999 | Ahuja et al. | 707/3 |
| 5,978,359 | A  * | 11/1999 | Caldara et al. | 370/236 |
| 5,983,360 | A  * | 11/1999 | Ugajin | 714/11 |
| 6,018,526 | A  * | 1/2000 | Liu et al. | 370/401 |
| 6,101,170 | A  * | 8/2000 | Doherty et al. | 370/255 |
| 6,101,188 | A  * | 8/2000 | Sekine et al. | 370/401 |
| 6,151,297 | A  * | 11/2000 | Congdon et al. | 370/216 |
| 6,185,630 | B1 * | 2/2001 | Simmons | 710/10 |
| 6,212,164 | B1 * | 4/2001 | Murakami et al. | 370/230 |
| 6,289,414 | B1 * | 9/2001 | Feldmeier et al. | 711/108 |
| 6,578,080 | B1 * | 6/2003 | Dwork | 709/229 |
| 6,591,317 | B1 * | 7/2003 | Schzukin et al. | 710/52 |
| 6,633,865 | B1 * | 10/2003 | Liao | 707/3 |
| 6,665,297 | B1 * | 12/2003 | Hariguchi et al. | 370/392 |
| 6,678,678 | B2 * | 1/2004 | Lee et al. | 707/3 |
| 6,687,247 | B1 * | 2/2004 | Wilford et al. | 370/392 |
| 6,690,667 | B1 * | 2/2004 | Warren | 370/389 |
| 6,732,184 | B1 * | 5/2004 | Merchant et al. | 709/238 |
| 6,738,829 | B1 * | 5/2004 | Wiles et al. | 719/321 |
| 6,779,043 | B1 * | 8/2004 | Crinion | 709/249 |
| 6,859,459 | B1 * | 2/2005 | Yamashita | 370/401 |
| 6,870,840 | B1 * | 3/2005 | Hill et al. | 370/389 |
| 6,987,768 | B1 * | 1/2006 | Kojima et al. | 370/401 |
| 7,103,008 | B2 * | 9/2006 | Greenblat et al. | 370/258 |
| 7,116,672 | B1 * | 10/2006 | Sivakumar | 370/395.4 |
| 7,130,903 | B2 * | 10/2006 | Masuda et al. | 709/225 |
| 2004/0039845 | A1 * | 2/2004 | Feldmeier et al. | 709/245 |
| 2005/0063382 | A1 * | 3/2005 | Fenner | 370/389 |

FOREIGN PATENT DOCUMENTS

| | | |
|---|---|---|
| EP | 0 993 156 A2 | 4/2000 |
| WO | WO 00/11888 | 3/2000 |
| WO | WO 01/67686 A1 | 9/2001 |

* cited by examiner

METHOD FOR CREATING A DYNAMIC ADDRESS TABLE FOR A SWITCHING NODE IN A DATA NETWORK AND A METHOD FOR TRANSMITTING A DATA MESSAGE

CROSS REFERENCE TO RELATED APPLICATIONS

This application is the US National Stage of International Application No. PCT/DE02/03431, filed Sep. 13, 2002 and claims the benefit thereof. The International Application claims the benefits of German application No. 10147419.9 DE filed Sep. 26, 2001, both of the applications are incorporated by reference herein in their entirety.

FIELD OF INVENTION

The invention relates to a method for creating a dynamic address table for a switching node in a data network, in particular in an automation system, and to a method for transmitting a data message via a switching node of such a data network, and to a corresponding switching node and a corresponding data network and computer program.

BACKGROUND OF INVENTION

From the prior art, various types of data networks are known in which the data network components decide on the port of the respective data network component via which a data message is to be sent. In particular, switchable data networks, as they are called, are also known in which a connection is established in the data network between two subscribers by means of one or more point-to-point connections.

It is likewise known from the prior art that the decision concerning the port of a data network component via which a previously received data message is to be sent is made with the aid of an address table. Each entry in the address table stores e.g. the station address of a target data network component (a unicast address, as it is called), or a multicast address or a network address and the numbers of the respective ports of the data network component via which a received data message for forwarding to its target address is to be sent.

Also known from the prior art is the use of dynamically modifiable and static address tables. Dynamic address tables have dynamically modifiable table entries which are administered independently by the hardware of the respective data network without software support. The static entries in a static address table, by contrast, are administered by the application software of each data network component and may not be modified by the hardware of a data network component.

A possible method known from the prior art for recognizing whether an address, e.g. a multicast address, and the information assigned to the multicast address are stored in an address table is direct comparison of the target address of the respective data message with all the addresses stored in the address table. This method is time-consuming or requires a content-addressable memory.

A method which allows address entries which are initially mapped to the same entry address of the address table to be stored simultaneously in an address table is described in U.S. Pat. No. 5,923,660. In an Ethernet controller, a hash address table is to this end provided with a corresponding control which forms the hash value of the address of a data packet in order to find an initial value for an entry in the hash address table. This initial value is modified if necessary by a fixed entry value if the address which in the line of the hash address table identified by the initial value does not match the target address received [sic].

Data networks enable communication between multiple subscribers by the networking, i.e. connecting of individual subscribers to one another. Communication in this case means the transmission of data between the subscribers. The data to be transmitted is sent in this case as data messages, i.e. the data is packaged together into multiple packets and sent in this form via the data network to the corresponding recipient. It is customary therefore to talk of data packets.

The term 'transmission of data' is used synonymously here with the transmission of data messages or data packets mentioned above. The networking itself is achieved, for example in the case of switchable high-performance data networks, in particular Ethernet, in that between two subscribers at least one switching unit which is connected to both subscribers is switched in each case. Each switching unit can be connected to more than two subscribers.

Each subscriber is connected to at least one switching unit, but not directly to another subscriber. Subscribers are for example, computers, stored-program controllers (SPC) or other machines which exchange, in particular process, electronic data with other machines. In contrast to bus systems in which every subscriber can access every other subscriber of the data network directly via the data bus, switchable data networks involve exclusively point-to-point connections, i.e. a subscriber can access all the other subscribers in the switchable data network only indirectly, through corresponding forwarding of the data to be transmitted by means of one or more switching units.

In distributed automation systems, for example in the field of drive engineering, certain data must be received at certain times by the subscribers specified for it and be processed by the recipients. It is customary here to talk of real-time critical data or data traffic, since a failure of data to arrive at the point of destination at the proper time leads to undesired results for the subscriber. In compliance with IEC 61491, EN61491 SERCOS interface—brief technical description successful real-time critical data traffic of the type specified can be guaranteed in distributed automation systems.

From the prior art, various standardized communication systems, also called bus systems, for the exchange of data between two or more electronic modules and/or devices, in particular also for use in automation systems, are known. Examples of such communication systems are: Feldbus, Profibus, Ethernet, Industrial Ethernet, FireWire or even PC-internal bus systems (PCI). These bus systems are in each case designed and/or optimized for different application fields and permit the establishment of a distributed control system. For process control and supervision in automated production and in particular in the case of digital drive technologies, very fast and reliable communication systems with predictable response times are required.

With parallel bus systems such as, for example, SMP, ISA, PCI or VME, very fast and simple communications can be established between different modules. These known bus systems find use in particular in computers and PCs.

Synchronous clocked communication systems with equidistance characteristics are known from automation engineering, in particular. Such a system is deemed to refer to a system comprising at least two subscribers which are connected to one another via a data network for the purposes of mutually exchanging data and/or mutually transmitting data. Data is in this case exchanged cyclically in equidistant communication cycles which are predetermined by the communications clock pulse used by the system. Subscribers include for example central automation devices, programming, configuring or operator devices, peripheral devices such as e.g. input/output modules, drives, actuators, sensors, stored-program controllers (SPC) or other control units, computers or machines which exchange electronic data with other machines, and in particular process data from other machines. Control units are deemed below to refer to closed-loop or open-loop control units of any type.

An equidistant, deterministic and cyclical exchange of data in communication systems is founded on a shared clock pulse or timing basis of all the components involved in the communication. The clock pulse or timing basis is transmitted from one identified component (pulse generator) to the other components. In an isochronous real-time Ethernet, the pulse or timing basis is preset by a synchronization master through the sending of synchronization messages.

German patent application DE 100 58 524.8 discloses a system and a method for transmitting data via switchable data networks, in particular the Ethernet, which allows the mixed operation of real-time-critical and non-real-time-critical, in particular Internet- and intranet-based, data communications.

It is also known from the prior art that the components of a switchable data network decide concerning the port of a switching node via which a data message is to be sent with the aid of dynamic address tables. A dynamic address table stores in each case station addresses of network components and the details of the port via which a data message is to be sent to this network subscriber. Since the configuration of the network can change dynamically (e.g. through activation, deactivation and/or failure or rewiring), and since on account of the limited storage capacity not all station addresses can be stored simultaneously in an address table, the table entries administered by the network component, that is e.g. by the switching node, are dynamically changeable.

Since components of a data network may e.g. fail or be rewired, an aging mechanism must be provided which can declare an address entry to be invalid if a certain condition of the aging method selected is fulfilled.

From European patent application EP-A-0 993 156 a corresponding aging method is known, in which a data message has to be received within a parameterizable time interval from the respective network component with the station address entered in the address table in order to remain marked as valid.

FIG. 1 shows a corresponding data network known from the prior art. The data network 1 contains a switching node 2 with ports A, B, C and D and a switching node 3 with ports E, F, G and H. The port C of the switching node 2 is connected to an automation component 4 and the port B to a further switching node which, for the sake of clarity, is not shown in FIG. 1.

The port D is also connected to the port E of the switching node 3. The ports F, G and H of the switching node 3 are connected to the automation components 5, 6 and 7 respectively.

Each of the switching nodes 2 and 3 contains an address table 8. Each line of an address table 8 contains a station address of one of the components of the data network 1, that is, of one of the automation components 4, 5, 6 or 7, for example. A respective line of the address table 8 of the switching node also contains details of the port of this switching node, from which port a data message received by the switching node is to be forwarded with the station address as the target address. Furthermore, such a line of the address table 8 contains an entry regarding the aging of the entry in the respective line, that is, regarding the validity of this entry.

An entry in a line of the address table 8 is then generated if a data message 9 with a source address and a target address is received, for example at port A of the switching node 2. Said message may for example be an Ethernet data message.

The fact that a data message with the respective source address has been received at port A is recorded in the address table 8 as an entry in a line of the address table. An aging bit in the respective line of the address table is set e.g. to 0 so as to indicate the current status of this entry.

Each of the switching nodes 2 and 3 has a time base which in each case applies globally to the address table 8. The time base can be implemented with a counter which in each case counts up to a threshold value.

After a current entry has been generated in the address table 8, and the counter is reset, the aging bit is set e.g. from 0 to 1. The entry then continues to be valid. If, at a time at which the aging bit is set to 1, a further data message 9 is received, the aging bit is again reset e.g. to 0. If this is not the case, then when the counter is next reset the aging bit is set e.g. to 2, which indicates that the entry is invalid.

The address tables 8 are administered here by means of a program 10.

A particular disadvantage of this method is that the address table 8 periodically has to be fully read out in order to check whether an entry should be marked as invalid.

SUMMARY OF INVENTION

The object of the invention is therefore to create an improved method for creating a dynamic address table and an improved method for transmitting a data message and an improved switching node and a corresponding data network and computer programming product.

The object of the invention is achieved in the respective features of the independent claims. Preferred embodiments of the invention are described in the dependent claims.

The aging mechanism according to the invention is particularly advantageous since it is event-driven with reference to the respective entry in the address table. By comparison with the time-based aging mechanism known from the prior art, this is particularly advantageous since the address table does not periodically have to be fully read out in order to check whether an entry should be marked as invalid.

According to a preferred embodiment of the invention, an entry in the address table is declared invalid if, since the data message last received from the network subscriber whose station address is entered in the address table, the number of data messages sent to this network subscriber is greater than a parameterized value.

According to a further preferred embodiment of the invention, the counted number of data messages sent to this network subscriber is reset if another data message is received from this network subscriber.

According to a further preferred embodiment of the invention, the updating and checking of the validity of a table entry is event-driven, i.e. with each send process when the network component decides with the aid of the address table via which port a data message is to be sent, and the station address of the network component for which the data message is intended is entered in the address table. By comparison with the time-driven aging method, this considerably reduces storage access to the address table.

BRIEF DESCRIPTION OF THE DRAWINGS

A preferred embodiment of the invention is described in detail below with reference to the drawings, in which.

DETAILED DESCRIPTION OF INVENTION

Figure 1:
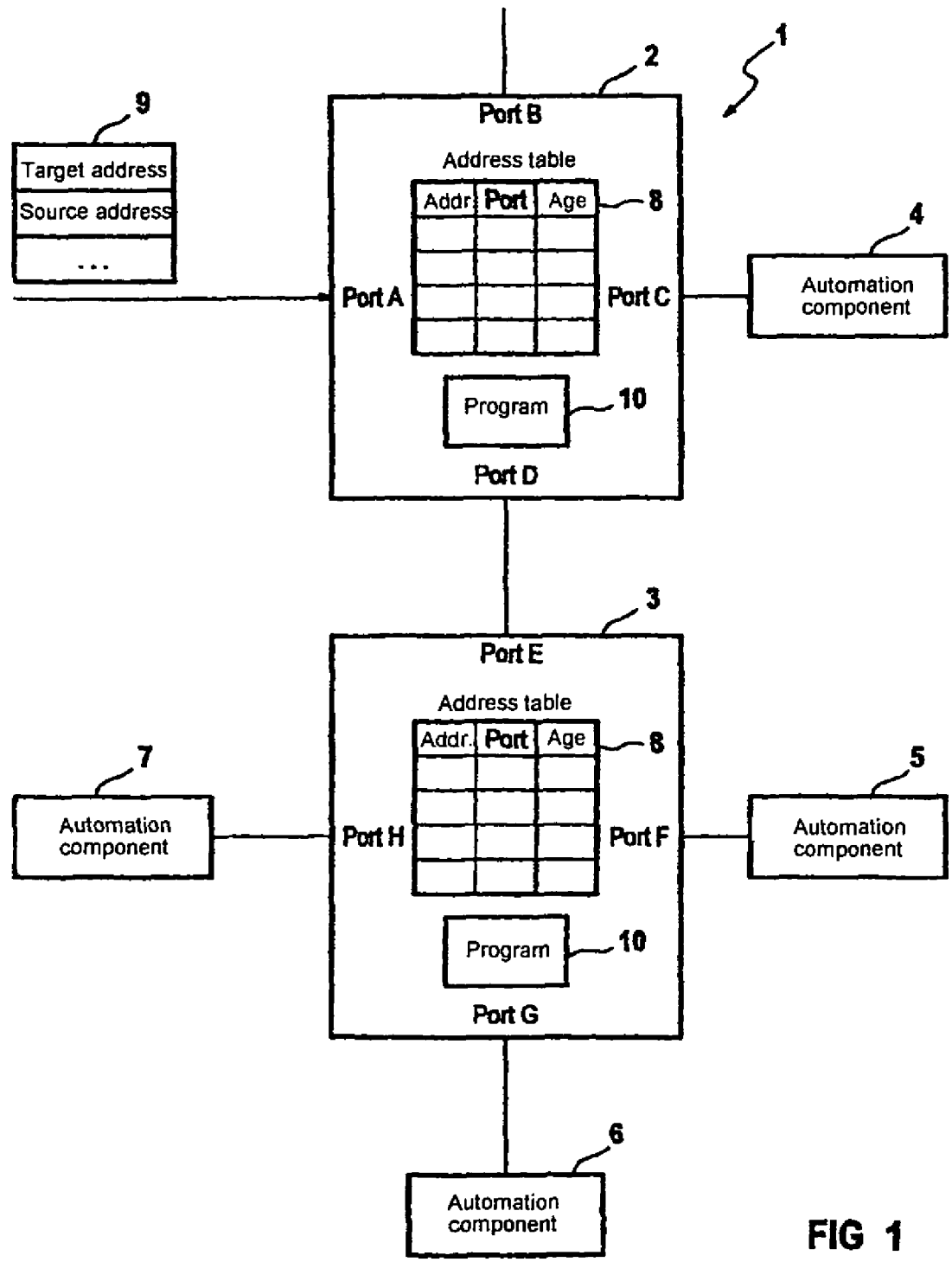
FIG. 1 shows a segment of a data network according to the prior art.
Figure 2:
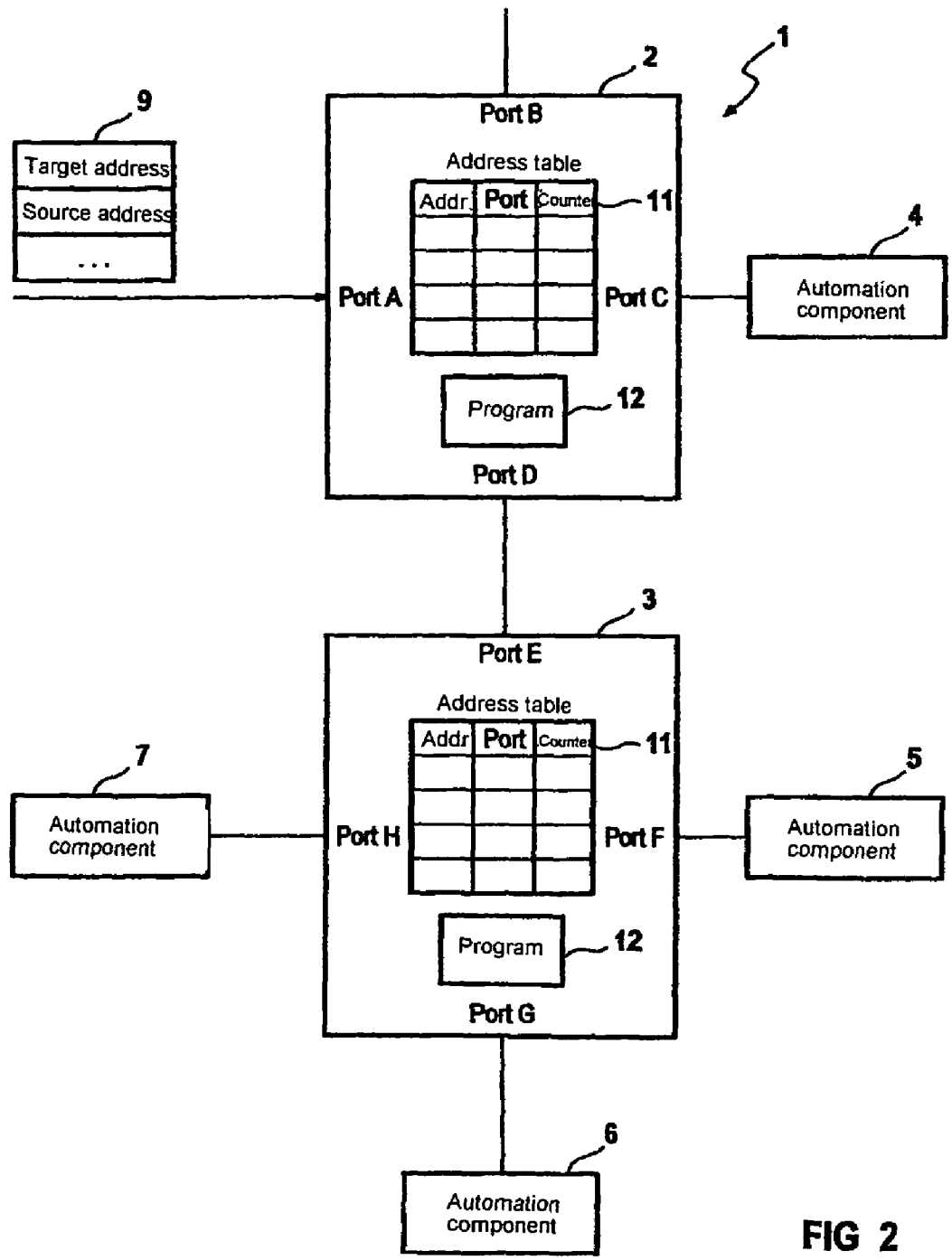
FIG. 2 shows a segment of an embodiment of a data network according to the invention.

In FIG. 2, elements which correspond to elements in FIG. 1 are labeled using the same reference symbols.

The switching nodes 2 and 3 each have an address table 11 according to the invention and a component 12 for administering the address table 11. This table administration component 12 can be implemented in software and hardware.

If for example the switching node 2 receives at its port A a data message 9, then an entry is generated in the address table 11 based upon this. This entry in the address table 11 contains the source address of the data message 9 and the receiving port, i.e. in the example looked at, the input of the port A.

In addition, the respective entry contains a counter initial value. This can be parameterized for the data network 1 or for individual switching nodes and can be selected e.g. as 128.

If a further data message is now received by the switching node 2, for example from the automation component 4 at port C, said data message having as the target address the source address of the data message 9, then the corresponding entry in the address table 11 is accessed.

The program 12 then firstly checks whether the current counter value of the respective entry is greater than 0. If this is the case, the entry is considered valid and the data message received from the automation component 4 is forwarded via the port of the switching node 2 specified in the entry, i.e. via the port A. In addition to this, based on the receipt of a data message addressed to the source address in switching node 2 the current counter value of the table administration component 12 is decremented.

This procedure can be repeated for example until such time as the current counter value has reached the value 0. The respective entry is then marked as invalid on account of the value 0. Thus, the counter initial value corresponds to a maximum number of data messages addressed to the source address which are received by the switching node 2 before the respective entry is considered invalid.

Instead of decrementing the counter initial value it is also possible to stipulate a threshold value which corresponds to the maximum number of data messages which are addressed to the source address, the current counter value then being incremented each time such a data message is received.

Of particular advantage here is that the current counter values of the individual lines in the address table 11 are modified only in an event-driven manner. Upon receipt of a data message with the source address of the data message as the target address, access to the respective entry in the address table 11 is necessary in order to determine the particular port via which the respective data message is to be forwarded. When such an access is made, the current counter value is accessed simultaneously in order to check and, where applicable, decrement or increment this current counter value.

If the data message 9 is again received from the switching node 2, then the current counter value of the respective entry in the address table 11 is reset to the counter initial value.

An analogous procedure applies in respect of the address table 11 of the switching node 3 and its program 12, and in respect of the other switching nodes in the data network 1, which are not shown in FIG. 2.

The switching nodes 2 and 3 can be individual devices, or they can also each constitute an integral part of an automation component. Automation components are principally considered to include all closed-loop control, open-loop control, drive and other components of an automation system.

Figure 3:
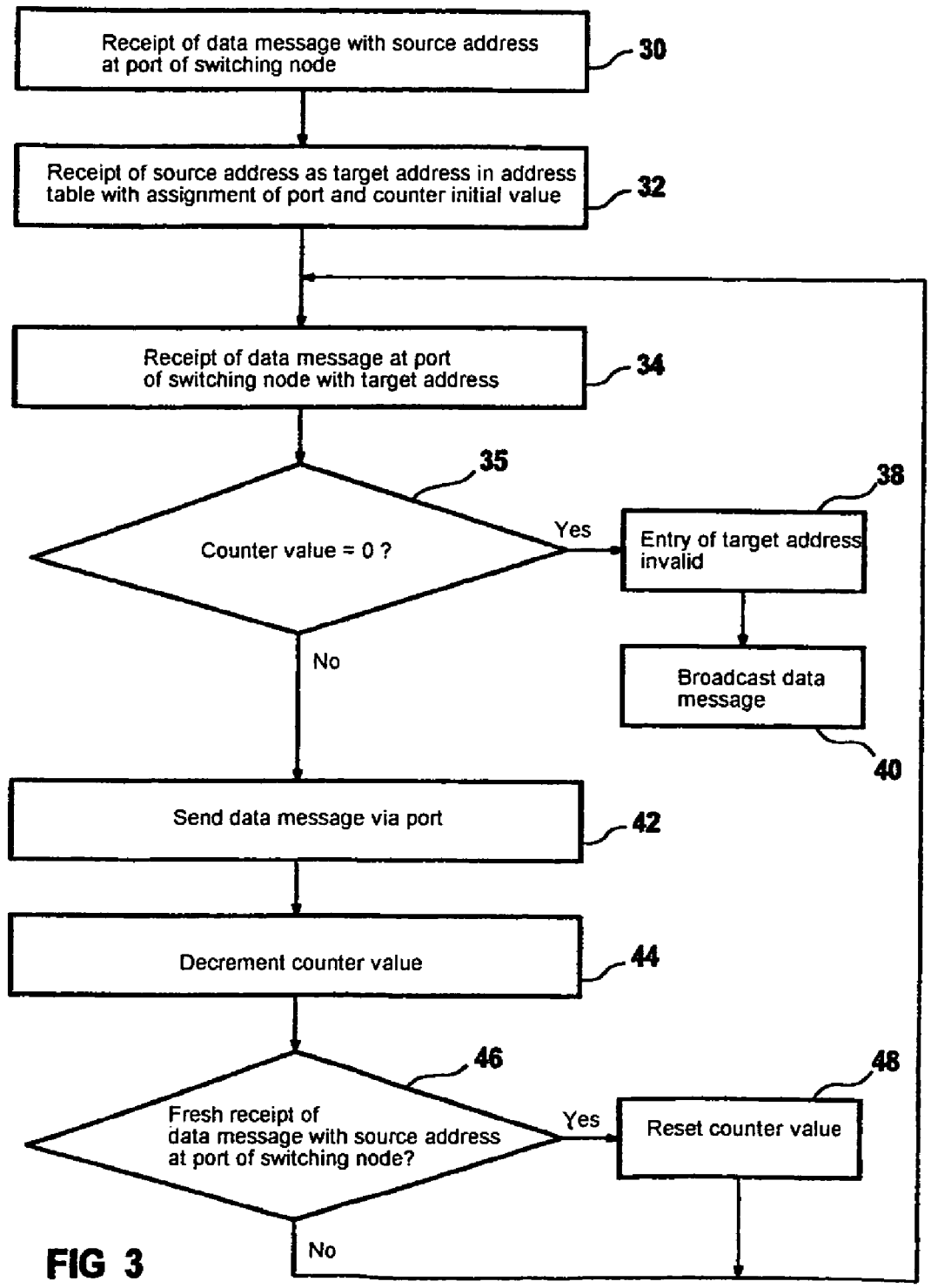
FIG. 3 shows a flowchart of an embodiment of a method according to the invention.

FIG. 3 shows a corresponding flowchart.

In step 30, a data message is received at a port of the switching node of the data network, which switching node is examined here. This data message contains a source address, i.e. the station address of the data network subscriber which sent the data message, as well as a target address for the data message, i.e. the station address of the particular data network subscriber which is to receive the data message.

In step 32, the source address of the data message received in step 30 by the switching node is entered in the address table of the switching node. In the corresponding entry of the address table this source address has the function of a target address, i.e. if a data message with the source address of the data message of step 30 as the target address is received by the switching node at a different port, then the corresponding entry in the address table is accessed. This entry contains, in addition to the station address of the subscriber which sent the data message of step 30, the port at which the data message of step 30 has been received by the switching node under consideration, and a counter value.

When the entry in the address table is created in step 32, a counter initial value is assigned to the counter value.

In step 34, a data message is received at another port of the switching node with a target address. The target address of the data message of step 34 is the same as the source address of the data message of step 30.

In step 36, the address table is then accessed and the entry in the address table with the target address of the data message of step 34 is read. A check is then made in this entry as to whether the current counter value equals 0.

If the current counter value equals 0, then this means that the respective entry in the address table is invalid or is no longer valid. This is determined in step 38. The switching node cannot therefore determine via which of its ports the data message is to be forwarded in order to reach the desired target address. Therefore, in step 40 the data message which has been received in step 34 is forwarded as a broadcast data message, i.e. the data message is forwarded via all the ports of the switching node, with the exception of the port at which the data message was received in step 34.

If the check in step 36 reveals that the current counter value is greater than 0, then step 42 is then executed. In step 42, the data message is sent via the port of the switching node which is specified in the respective entry of the address table. In step 44, the current counter value of the respective entry is then decremented.

A check is made in step 46 to see whether a data message has again been received by the switching mode under consideration at the same port and with the same source address as in step 30. If this is the case, the counter value of the respective entry in the address table is reset in step 48 to the counter initial value. The sequence control system than goes back to step 34.

If the check in step 46 reveals that such a receipt has not occurred, the sequence control system goes directly to step 34.

The invention claimed is:

1. A method for creating a dynamic address table for a multi-port switching node in a data network for a plurality of data messages each having a target address, comprising the steps of:

receiving a first data message with a source address at a first of multiple ports of the switching node; and entering data in a line of the address table that is assigned to the source address as a target address, the data comprising: (1) the source address, (2) port details, and, (3) an initial value assigned to a counter value, wherein the counter value is adjustable toward a predetermined value based on receipt of one or more data messages having the source address of the first data message as the target address, wherein the predetermined value is determinative as to whether the source address is no longer valid as the target address such that a current counter value indicates whether an entry is valid, and the current counter value is adjusted to the initial value if the entry is no longer valid.

2. The method according to claim 1, wherein the current counter value is reset to the counter initial value if a third data message with the source address is received at the port.

3. The method according to claim 1, wherein the current counter value is incremented upon each receipt of a subsequent data message having the source address as the target address and the entry is valid.

4. The method according to claim 1, wherein the current counter value is decremented upon each receipt of a subsequent data message having the source address as the target address and the entry is valid.

5. The method according to claim 1, wherein the source address and the target address are in each case unicast addresses.

6. The method as claimed in claim 1, wherein the switching node is used for a data network and to create a dynamic address table.

7. The method according to claim 1, further including the step of implementing the steps of claim 1 in a computer programming product for creating a dynamic address table.

8. A method for transmitting a data message with a target address via a switching node of a data network, comprising the steps of:

providing a counter with an initial value assigned as a counter value, the counter value adjustable toward a predetermined value based on receipt by the switching node of the data message having the target address, wherein the predetermined value is determinative as to whether the counter value is no longer valid;

receiving the data message by the switching node;

accessing a line of an address table assigned to the target address of the data message;

checking an entry of a current counter value to determine whether the entry in the line is valid; and forwarding the data message to a port specified in the line if the entry is valid; and adjusting the current counter value based on receipt of the data message if the value is valid and setting the counter value to the initial value if the current value is not valid.

9. The method according to claim 8, wherein the data message is forwarded from the switching node as a broadcast data message if the entry is not valid.

10. The method as claimed in claim 8, wherein the switching node transmits a data message.

11. The method as claimed in claim 8, wherein the data network further comprises the switching node.

12. The method according to claim 8, further including the step of implementing the steps of claim 8 in a computer programming product for transmitting a data message.

* * * * *